United States Patent [19]

McCabe

[11] 4,146,048
[45] Mar. 27, 1979

[54] FIRE DAMPER AND METHOD OF FABRICATION

[75] Inventor: Francis J. McCabe, Doylestown, Pa.

[73] Assignee: Prefco Productions, Inc., Buckingham, Pa.

[21] Appl. No.: 792,525

[22] Filed: May 2, 1977

[51] Int. Cl.$^2$ .................... F16K 17/38; E05D 7/10
[52] U.S. Cl. .................... 137/75; 29/157.1 R; 29/433; 29/434; 126/285 R; 137/375; 137/512.1; 160/1
[58] Field of Search ................ 137/67, 72, 73, 75–77, 137/375, 512.1, 516.11; 160/1, 6; 49/1–3, 7; 251/212; 16/48.5; 26/287.5, 285 R; 98/1, 86, 107, 110, 121 A; 29/157.1, 433, 434

[56] References Cited

U.S. PATENT DOCUMENTS

| | | | |
|---|---|---|---|
| 2,148,530 | 2/1939 | Burke | 98/86 X |
| 3,009,473 | 11/1961 | Hennen | 251/212 X |
| 3,337,991 | 8/1967 | Adams | 98/86 X |
| 3,720,153 | 3/1973 | Jardinier et al. | 98/1 X |
| 3,725,972 | 4/1973 | McCabe | 16/48.5 |
| 3,899,156 | 8/1975 | McCabe | 137/457 X |

FOREIGN PATENT DOCUMENTS 2307228  5/1976  France .................... 137/75

Primary Examiner—Martin P. Schwadron
Assistant Examiner—Richard Gerard
Attorney, Agent, or Firm—Benasutti Associates, Ltd.

[57] ABSTRACT

A butterfly damper with a plurality of blades which can be locked in the open position, and which, when released, rotate about a hinge to the closed position. A pawl member, attached to one blade, extends away from the blade and through an opening in a second blade when the blades are in the open position. A mounting member attached to the second blade restrains the pawl member thereby holding the blades in the open position. A bimetallic link attached to the mounting member causes the pawl member to be released when the temperature of the air passing through the duct increases beyond a preselected level. A closure spring attached to the blades acts on the blades tending to force them apart against the action of the mounting member and the pawl member when the blades are restrained in the open position. The damper blades can be insulated to prevent the heat from a fire on one side of the damper from being conducted by the damper to the other side when the blades are in the closed position.

A method of fabricating a butterfly damper is described which minimizes welding and riveting thereby simplifying fabrication.

19 Claims, 9 Drawing Figures

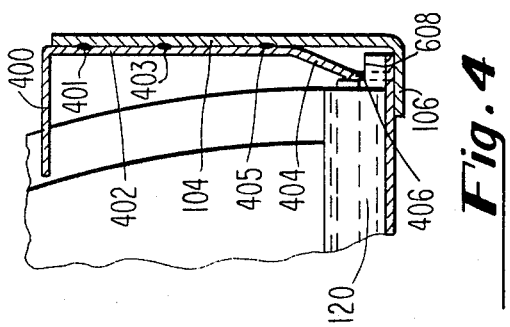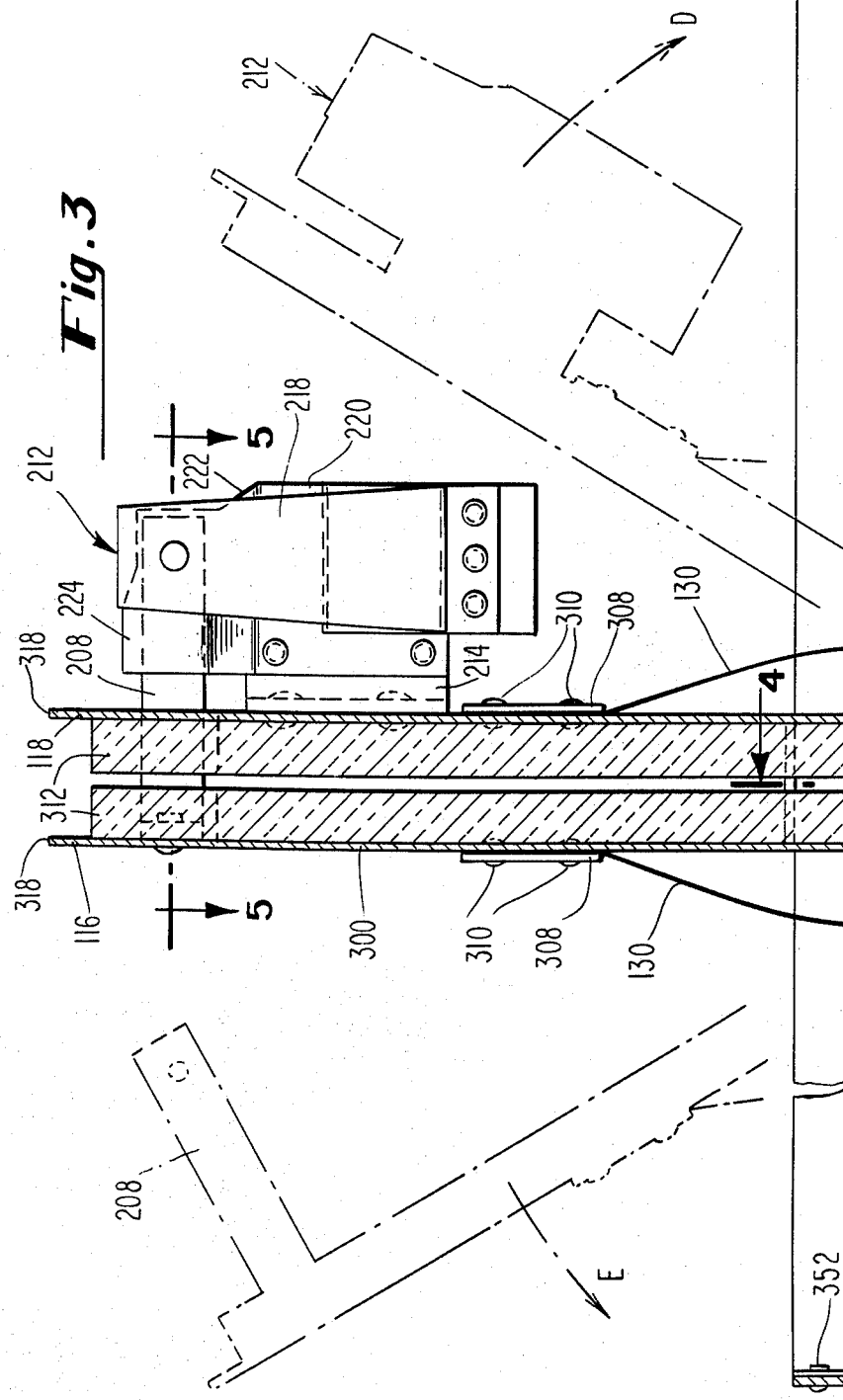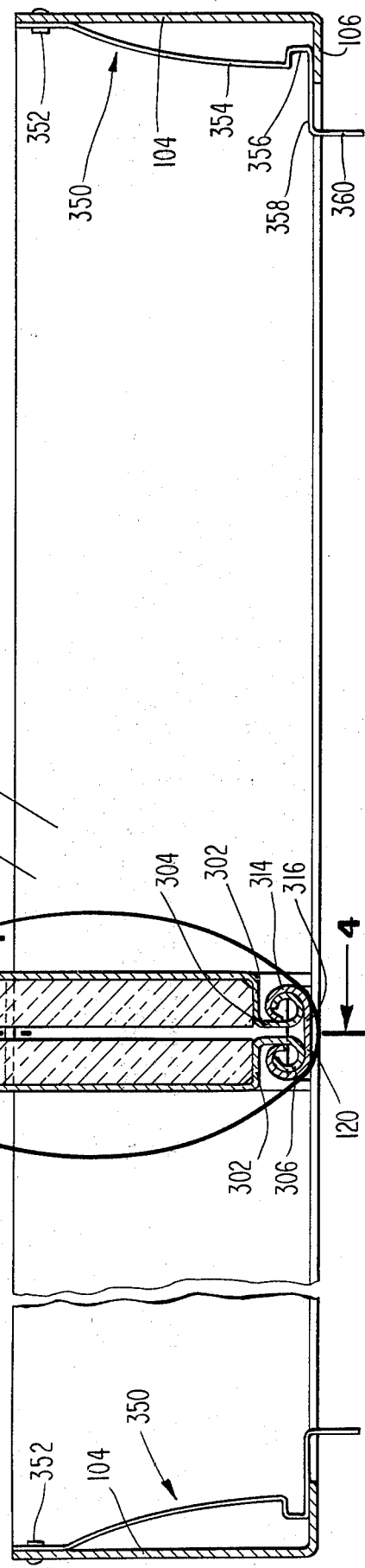

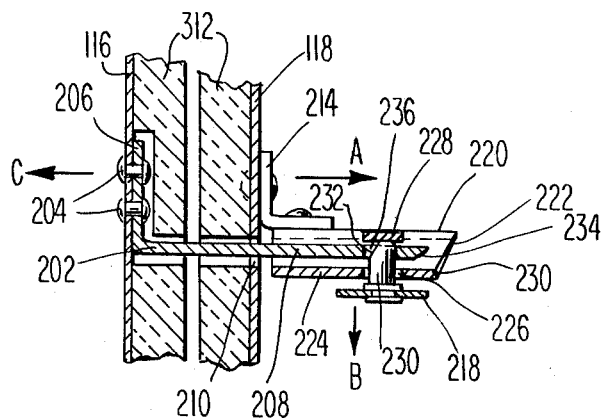
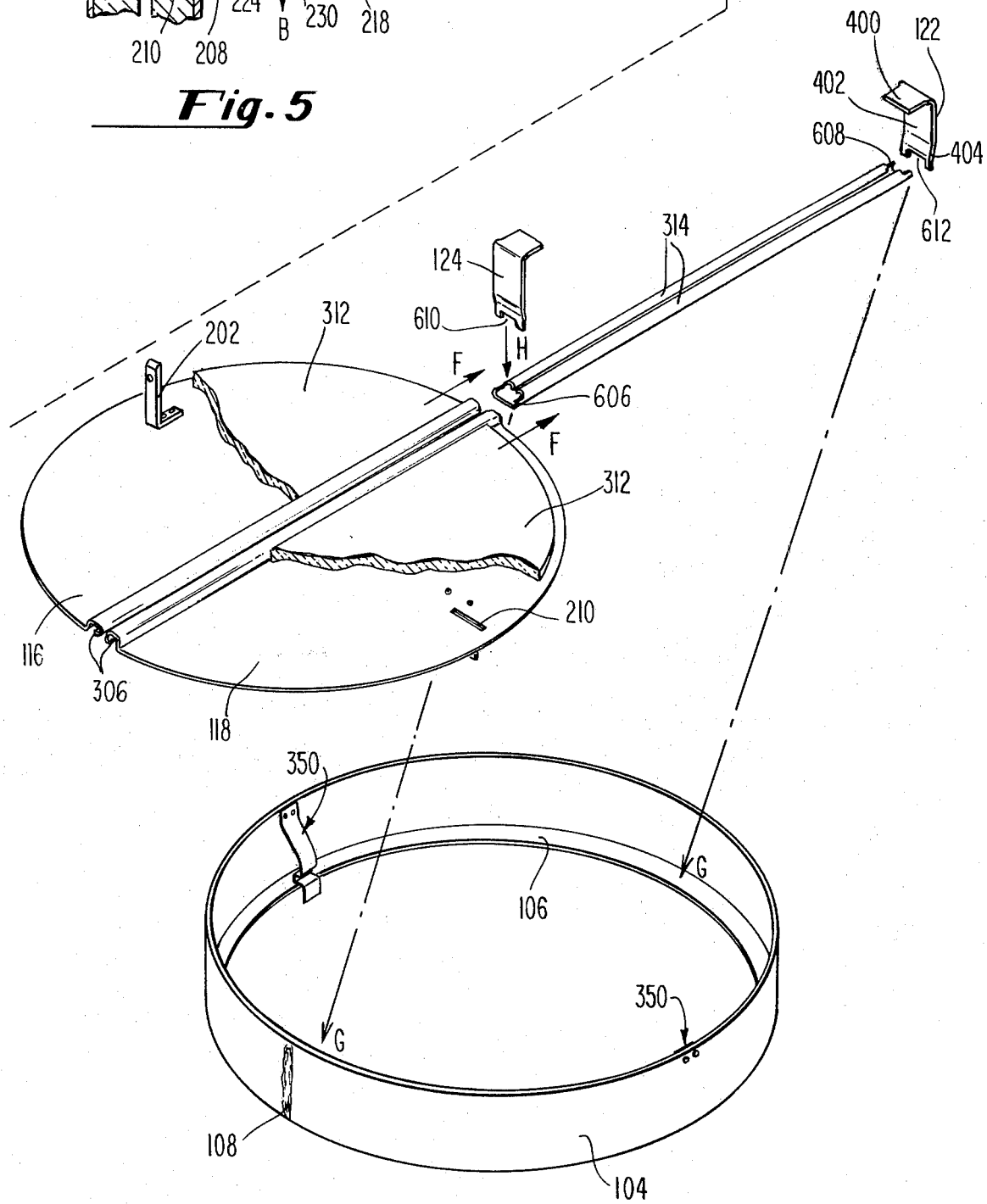

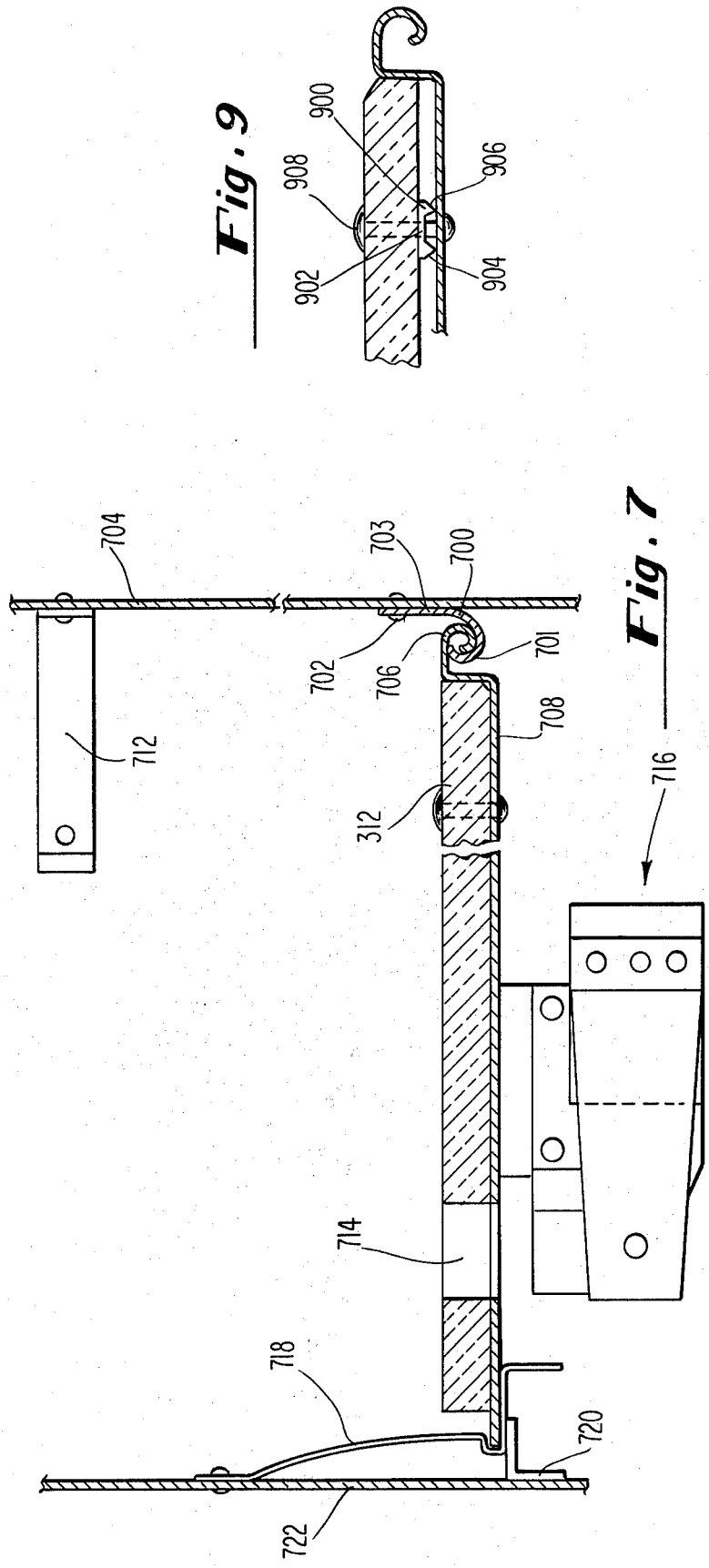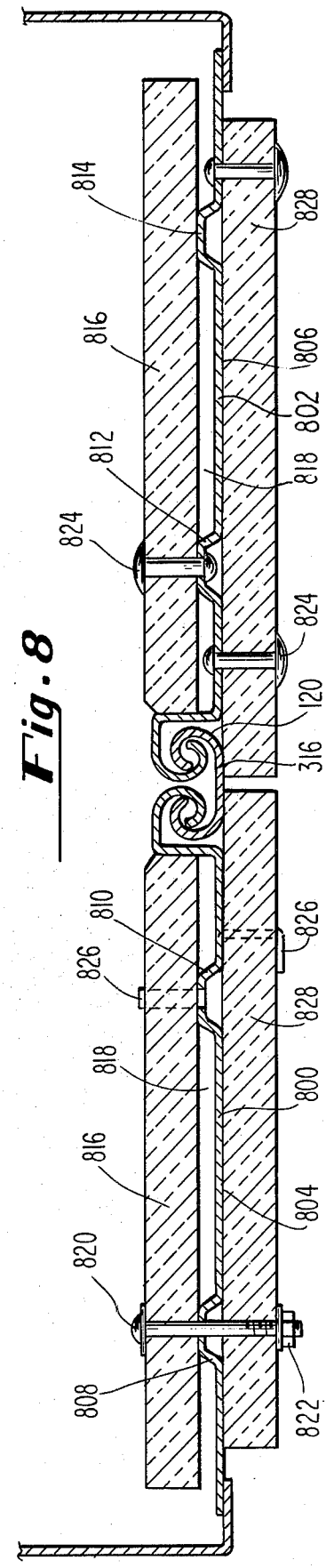

FIRE DAMPER AND METHOD OF FABRICATION

BACKGROUND OF THE INVENTION

I. Field of the Invention

The invention relates to butterfly fire dampers for use in air ducts.

II. Description of the Prior Art

Multiple, folding blade fire dampers having a plurality of blades disposed within a frame having an inwardly depending flange are known in the prior art, for example, my U.S. Pat. Nos. 3,814,165 and 3,866,657.

In my U.S. Pat. No. 3,899,156, a single blade fire damper is described along with some problems which accompany the use of the multiple, folding blade fire damper type.

When a fire occurs on one side of the damper, often the damper is equipped with means for automatically closing the blades and preventing spread of the fire to the other side of the damper. However, the heat from the fire on one side of the blade is often transmitted by the blades to heat the air on the other side.

SUMMARY OF THE INVENTION

A butterfly fire damper is disclosed for use in air ducts, the damper remaining open under normal conditions. However, in the event of fire, the damper is equipped to automatically snap shut to thereby prevent the spread of fire through the duct. Because fire dampers may sit for years in a duct without a fire occurring, accumulating dirt and grease on the duct, hinges, and blades, etc., a damper design is needed that will insure quick and reliable operation during the one time or so that a fire occurs. The novel butterfly damper disclosed here accomplishes this through the interplay of several unique features. In a preferred embodiment, at least two blades engage a cross bar comprising two hinge elements which extend along the entire length of the cross bar to bridge the duct opening. The cross bar is attached on each end to a damper frame or flange or directly to the duct walls. In the open position, the blades are substantially parallel to one another and to the direction of flow of the atmosphere through the duct whereby the thin blade edges are streamlined into the air flow to minimize resistance to air flow through the duct.

To hold the blades together in the open position, a new linkage means, which is located entirely on the blades, is disclosed for use with butterfly fire dampers. In the preferred embodiment, a mounting member is attached to an outside surface of a first one of the blades, the mounting member including a heat responsive means for releasing the blades from one another should a fire start raising the temperature on one side of the damper above a preselected safe temperature. A pawl member attached on an inside surface of an adjacent blade extends away from the blade through an opening in the first blade to engage the mounting member. If the heat responsive means is activated, the pawl member is released freeing the blades from one another.

With the blades now free to rotate, a novel closure means is disclosed attached to the outside surfaces of each blade and arching around the cross bar in such a way as to provide a positive force acting to move the blades away from one another to rotate them towards the closed position about the cross bar in a snap-like action which overcomes the inertia of the blades in the open position.

Various means can be employed to stop the rotation of the blades around the cross bar when the blades reach the closed position. For example, in the preferred embodiment, an inwardly depending flange is attached or made part of a damper frame which is configured to match the shape of a duct. Easily releasable locking spring clips can be mounted on or adjacent the flange to hold the blades in the closed position until the fire danger is over and the blades can be reset in the open position.

It is desirable to prevent not only the fire but also the high temperature that accompanies a fire from being conducted to the other side of the duct when the blades are in the closed position. The butterfly blade configuration provides a solid single plane barrier for maximun security against radiation and convection heat transfer. In addition insulation material can be placed directly on the blades without interfering with the configuration of the damper, air flow through the duct, or the snap-action of the blades. Even better insulation characteristics can be attained without using excessive amounts of insulation material by employing the various unique blade and spacing embodiments described later herein.

In addition to all of the above functions, the preferred embodiment butterfly damper of this invention can function with a volume control damper operator to regulate the flow of air through the duct and to function as a smoke damper through use with smoke detectors, etc.

An alternate embodiment of the features incorporated in the butterfly fire damper is a single blade damper for use in small ducts. In such an embodiment, the hinge element has a smaller cross-section than the compound shape of the hinge element for the butterfly fire damper and is attached directly to the side wall of the duct or damper frame. This minimizes blockage through the duct when the blade is in the open position, the blade in the open position being parallel to the flow of air through the duct as in the butterfly damper. A similar linkage means is provided with the pawl member being attached to the duct wall and extending therefrom through a hole in the damper blade. The single blade damper can be equipped with the insulation material and insulation techniques which are applicable to the butterfly damper configuration.

The simplfied design provides a method for easy construction and low cost production of the preferred embodiment butterfly damper for use in round or square ducts. A sleeve or frame is provided having a configuration of the duct with which the damper is to be used, the frame having an inwardly depending flange to coact with the damper blades to form a seal. The frame is preferably formed from one piece of material which is bent into the desired configuration to be riveted or otherwise fastened together at a single point. The blade and hinge portion of the damper is preassembled prior to its introduction into the frame and comprises at least two blades, each of which has along one of the edges thereof a hook-shaped hinge portion. A cross bar comprises two integral hook-shaped hinge elements which are complementally configured to the hinge portions of the blades, the cross bar having a dimension slightly smaller than the inside dimension of the frame.

The blade and hinge portion is formed by threading each of the hook-shaped hinge portions of the blades into the appropriate hook-shaped hinge element on the cross bar, whereupon the blade and hinge portion and particularly, the cross bar portion thereof is placed within the frame.

Hold down brackets are slipped over the ends of the cross bar to hold the cross bar against the flange. In the preferred embodiment, these hold down brackets are preferably oriented within the frame so that the innnerconnection of the two ends of the material formed in the frame will be made at one of those brackets so that riveting or other innerconnection of the brackets to this frame will further act to reinforce the connection between the ends of the frame, thereby reducing the labor required to construct the damper.

This novel method described a fabrication technique in which a novel double bladed damper may be assembled wherein the only welding or riveting which must be accomplished to complete the assembly thereof is that which is preformed in attaching the hold down brackets to adjacent portions of the frame. The damper is then easily adapted to receive springs, triggering devices, linkages or whatever peripheral equipment may be desired to operate same.

Accordingly, it is an object of the present invention to provide a butterfly fire damper having a novel linkage means attached to the blades when the blades are in the open position.

It is another object of the present invention to provide minimum resistance to air flow through the duct with the blades in the open position.

It is another object of the present invention to provide a butterfly fire damper with novel rotation means for rotating the blades about the cross bar of the damper.

It is another object of the present invention to provide a butterfly fire damper with superior heat insulation characteristics when the blades are in the closed position.

It is another object of the present invention to provide a single blade fire damper having a novel locking means for locking the blade in the open position.

It is another object of the present invention to provide a method of simplifying the fabrication of a butterfly fire damper.

This and other objects of my invention will become apparent from the following description with reference to the accompanying drawings.

BRIEF DESCRIPTION OF THE DRAWINGS

FIG. 3 is a greatly enlarged cross-section of the preferred embodiment butterfly damper of FIG. 2 taken as indicated by the lines and arrows 3—3 in FIG. 2, and shown partially broken away.

FIG. 4 is a cross-section of a portion of the preferred embodiment damper taken as indicated by the lines and arrows 4—4 in FIG. 3.

FIG. 5 is a cross-section of a preferred embodiment linkage means of the preferred embodiment damper attached to the blades taken as indicated by the lines and arrows 5—5 in FIG. 3.

FIG. 6 is an exploded view of the preferred embodiment butterfly damper of FIG. 1 showing the blades, hinge element, retaining brackets and damper frame with spring clip riveted thereto.

FIG. 7 is a cross-section of a preferred embodiment single blade fire damper showing the blade in the closed position engaging a hinge element attached to the wall of the duct and showing the linkage means, a portion of which is attached to the wall of the duct with the remainder attached to the blade.

FIG. 8 is an enlarged cross-section of an alternate configuration of the blades of the preferred embodiment butterfly damper providing an air space between the damper blades and the insulation material attached thereto, the blades shown in the open position.

FIG. 9 is a cross-section of a portion of a blade of the preferred embodiment butterfly damper showing an alternate means of providing an air space between the damper blades and the insulation material.

DETAILED DESCRIPTION OF THE DRAWINGS

Figure 1:
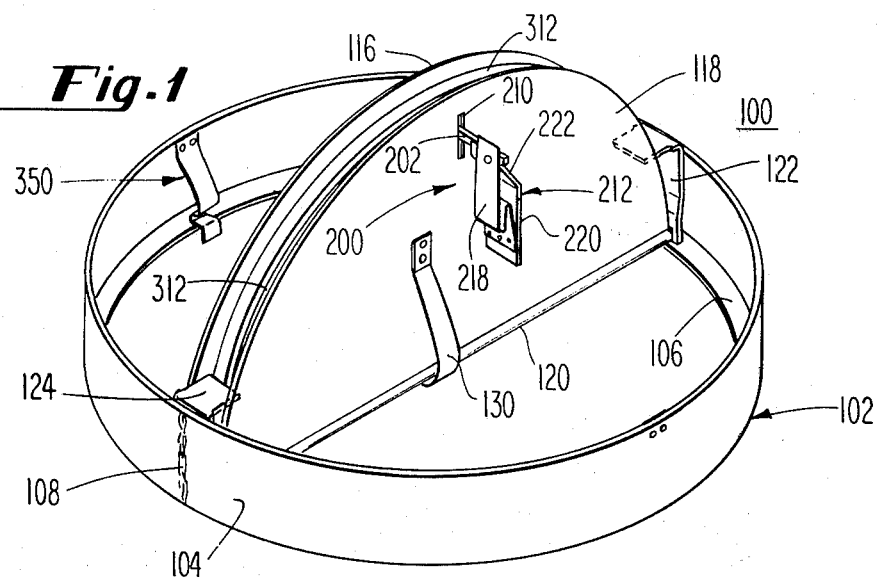
FIG. 1 is a perspective view of the preferred embodiment butterfly damper, showing the frame, blades, closure spring and pawl member and mounting member restraining the blades in the open position.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
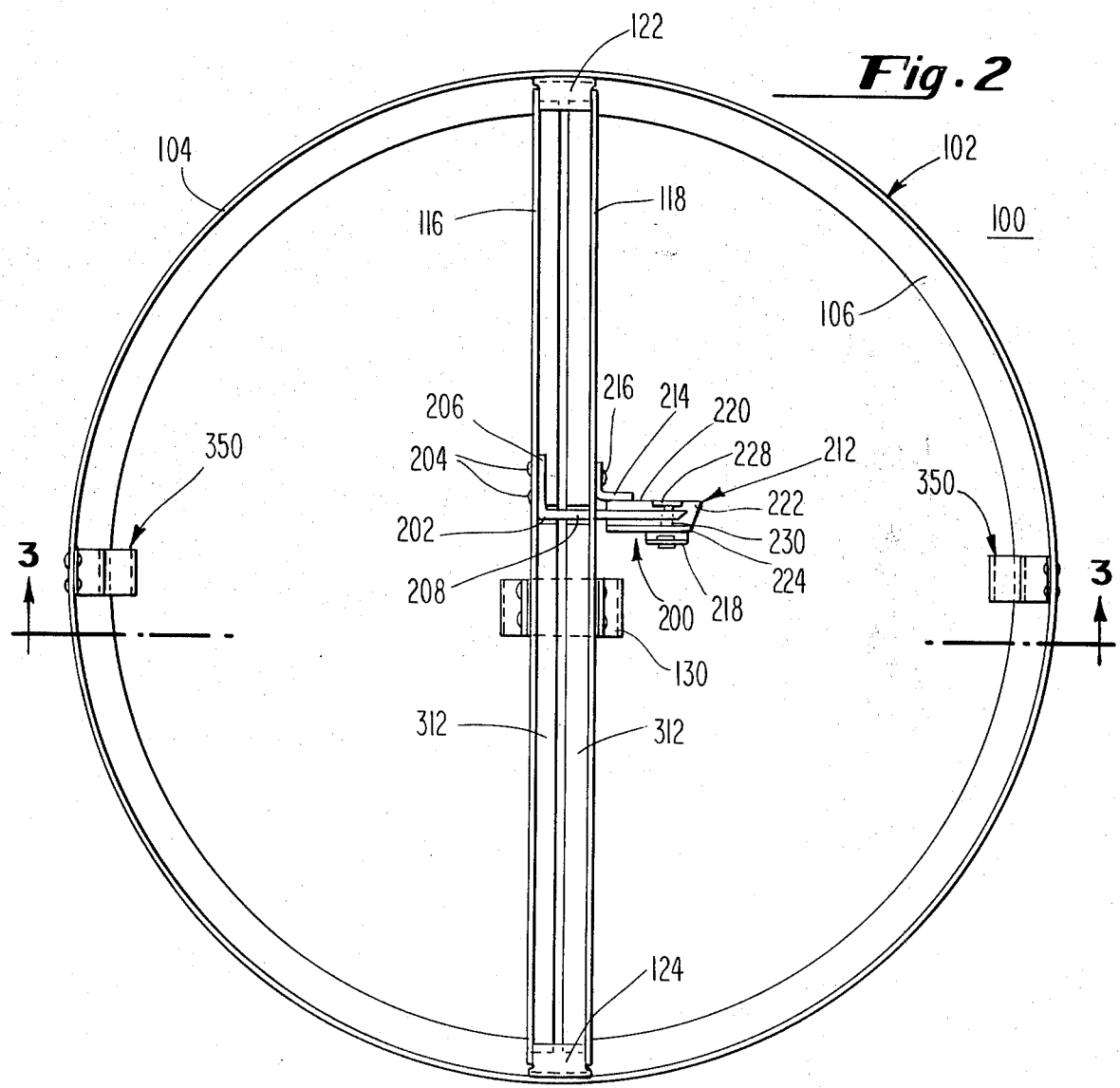
FIG. 2 is an enlarged plan view of the preferred embodiment butterfly damper of FIG. 1.

Referring now to all the figures, FIGS. 1 and 2 show the preferred embodiment butterfly damper designated generally 100. In the illustration shown here, the damper is circular having a frame designated generally 102, the frame having a wall 104 with an inwardly depending flange 106. The wall of the damper frame 104 is shown welded together to form the circle at weld line 108. It is, of course, not necessary that the damper frame be circular in cross-section since it can be formed to fit any shape duct, such as a duct with a square or rectangular cross-section.

During normal conditions of air flow through the duct, for example, when there is no fire present, the hemispherical blades 116 and 118 of the preferred embodiment damper of FIGS. 1 and 2 must remain locked in the open position. In this position, the blades are parallel to and spaced apart from one another and are parallel to the direction of flow of air or atmosphere through the duct whereby the thin blade edges are streamlined into the air flow to minimize resistance or blockage to the flow of air through the duct.

A novel linkage means designated generally 200 and shown attached to the blades 116 and 118 in FIGS. 1 and 2, provides a means for restraining the blades in the open position during normal conditions and for releasing the blades should the temperature of the atmosphere passing through the blades exceed a pre-determined temperature. A pawl member 202 is attached by rivets 204 to the inside surface of blade 116, the inside surface being the surface facing the substantially parallel blade 118 when the blades are in the open position. The portion of the pawl member riveted to blade 116 is a portion which is substantially planar and parallel to blade 116 and denoted 206. Substantially perpendicular to portion 206 is portion 208 of the pawl member 202 which extends away from the blade 116 toward the blade 118. Blade 118 has a hole or aperture 210, shown in FIG. 1, through which the portion 208 of the pawl member 202 extends. A mounting member designated generally 212 receives the pawl member portion 208 and retains it therein to hold the blades in the open position. The mounting member 212 is attached to the outside surface of blade 118 by bracket 214 which is riveted to the blade 118 by the rivets 216. The bracket 214 and rivets 216 are shown in FIG. 2. The remaining parts of the mounting member 212 are the serpentine bimetallic link 218 and the positioning bracket 220 both shown in FIG. 1.

To provide a means for pivoting between the open and closed positions, the blades 116 and 118 engage a cross bar 120. The cross bar 120 lies on the inwardly depending flange 106 of the frame 102, the cross bar spanning the diameter of the preferred embodiment butterfly damper. The cross bar is held to the frame 102 by hold down brackets 122 and 124.

When a fire does occur, it is important that the linkage means have the capability of automatically releasing the pawl from the retention therein so that the blades may be allowed to move to the closed position thereby preventing the spread of the fire from one side of the duct to the other.

This is accomplished through the interplay of the positioning bracket 220, and the serpentine link 218, and the pawl member 202, which relationship is shown most clearly in FIG. 1 and FIG. 5. In FIG. 5, the positioning bracket 220 is comprised of three portions: a first planar portion attached to bracket 214; a transverse portion 222 and a second planar portion 224 which is parallel to the first planar portion of the positioning bracket and shown in cross section in FIG. 5. The positioning bracket has a slot 226, shown in FIG. 5, which is notched from the transverse portion 222 and the second planar portion 224 of the positioning bracket. The material which is notched from the slot 226 forms a tab 228 which remains in the plane of the first planar portion. This tab is shown in cross-section in FIG. 5 and from an end view in FIG. 2. The serpentine bimetallic link 218 has a pin 230 thereon which has a beveled surface 232. Under normal conditions, the bimetallic link 218 is closely adjacent to the positioning bracket 220 and the pin 230 extends generally perpendicularly away from the link 218, through the slot 226 to provide a latching means for restraining the pawl member.

To place the blades in the open position, blades 116 and 118 are pivoted toward one another until the pawl member portion 208 passes through the opening 210 in the blade 118 in the direction of arrow A in FIG. 5 adjacent and parallel to the second planar portion 224 of the positioning bracket 220. The tapered or beveled end 234 of the pawl member, shown in FIGS. 2 and 5, encounters the beveled end 232 of the pin 230 on the serpentine link 218 thereby slightly moving the serpentine link away from the positioning bracket so that the pawl member may slide between the end of the pin 230 and the tab 228 of the positioning bracket. As the pawl member portion 208 moves further along the second planar portion of the positioning bracket, the bimetallic link 218 presses the pin 230 through the opening 236 in the pawl member. At this point the mounting member 212 has captured the pawl member and restrained the blades in the open position as shown in FIGS. 1, 2 and 5.

Should a fire occur, the high temperature of the atmosphere resulting from the fire will cause the serpentine link 218 to expand and move away from the positioning bracket 220. As this occurs, the pin 230 withdraws in the direction of arrow B from the opening 236 in the pawl member portion 208 thereby freeing the pawl member 202 to move and withdraw from the mounting member in the direction of arrow C in FIG. 5.

FIG. 1 shows a closure means or spring 130 attached to the outside surface of the blade 118. In FIG. 2, the spring 130 is seen to be attached to the outside surface of the blade 116 and 118 and this spring acts to force the blades from the open to the closed position. When the pawl member is restrained by the pin 230 on the serpentine link 218, the blades are not free to move to the closed position. However, when the temperature of the atmosphere passing through the duct has risen above a predetermined temperature due to a fire, for example, the serpentine link acts as described above and the pawl member is free to move the closure springs then force the blades to separate and move apart toward the closed position and the pawl member withdraws from the mounting member in a direction of arrow C in FIG. 5.

FIG. 3 shows an enlarged view of the butterfly damper frame and blade assembly with the closure spring and mounting member attached. The blades 116 and 118 are again shown locked in the open position. The blades have a long planar section 300 which curves into a transverse section 302 which is perpendicular to planar section 300 which extends towards the opposite blade. Connected to the transverse portion 302 is another straight section 304 which is in a plane parallel to the planar section 300 but spaced apart therefrom. Portion 304 then terminates in a hook-shaped portion 306 which runs across the entire length of the end of the blade. The cross bar 120 of the preferred embodiment comprises two hinge elements 314 which are joined together by a straight connecting portion 316. The hinge elements 314 extend almost along the entire length of the cross bar 120 and they are complementally configured to accept the hook-shaped portions 306 of the blades which, together, provide a means for pivotal displacement of the blades about the cross bar 120 between the open and closed positions.

The closure spring 130 can be seen attached to the outside surfaces of blades 116 and 118 by the brackets 308 and rivets 310, and arching around the cross bar 120. The mounting member 212 is shown attached to the blade 118 and the pawl member portion 208 is shown extending through the blade 118, into the mounting member 212.

In the closed position, the blades of the butterfly damper form a solid single plane barrier that provides significant security against the radiation and convection heat transfer of a fire. Added protection can be attained by attaching insulation material 312 to the planar portions 300 of the blades. Because of the transverse portions 302 of the blades, there is enough space between the planar portions of the parallel blades to accommodate the insulation material 312 without interfering with the configuration of the damper, the air flow through the duct, or the closing, snapaction of the blades.

After the bimetallic link 218 of the preferred embodiment has been activated by the high temperatures of a fire and the pawl member 202 is free to move, the blade 116 with the pawl member and the blade 118 with mounting member 212 move in the directions of arrows D and E respectively. An intermediate position of the blades during their travel from open to closed positions is shown in phantom in FIG. 3.

It is desirable once the blades have been moved to the closed position, that they remain in the closed position until the danger from the fire and high temperatures are over. To insure that the blades will stay locked in the closed position, easily releasable spring locking clips designated generally 350 are shown attached to the wall 104 of the damper frame 102. In FIG. 3, the spring clips are shown riveted by rivets 352 to the wall 104. The spring clip is comprised of an arching portion 354 which extends gradually inwardly from the flange 104 to intersect with the path of travel of the blades 116 and 118. Connected to the arching portion is a rectangular slot portion 356 which extends back toward the flange 104 and which is joined to a straight inwardly depending portion 358 which is generally parallel to the inwardly depending flange 106 of the damper frame. A final terminal portion 360 is disposed generally perpendicular to the inwardly depending portion 358 of the spring clip. When the edge of either blade 116 or 118 impacts the arching portion 354, it forces the spring clip 350 toward the wall 104 until the tip 318 of the blade slips into the slot portion 356 and the blade encounters spring clip straight portion 358 and the flange 106. The spring clip then moves outward slightly from the wall 104 until the back wall of the slot portion 356 encounters the tip 318 of the blade. Now the blades are locked in the closed position and are not free to move away from the closed position because of the action of the spring. When the fire or danger is over, the spring clip can easily be released by pressing against the portion 354 toward the wall 104 to release the blade from the slot 356.

FIG. 6 shows the novel way in which this fire damper can be assembled with a minimum of riveting and fabrication. The hemispherical blades 116 and 118 are shown in the planar closed position with the hook-shaped end portions 306 of the blades adjacent one another and with opening or aperture 210 in the blade 118. The blade portions 306 are threaded or slipped into the hinge elements 314 of the cross bar 120 by moving the blades toward and along the hinge element 120 in the direction shown by arrows F in FIG. 6. With the hook-shaped end portions of the blades engaging the hook-shaped hinge elements along the entire length, the blade and hinge portion of the damper is laid into the frame as shown by the arrows G in FIG. 6, the cross bar 120 spanning the diameter of the damper and resting on the inwardly depending flange 106 at both ends. In order to fix the blade and hinge portion onto the frame, hold down brackets 122 and 124 are shown ready to be placed over slotted portions 606 and 608 of the cross bar 120. The slots 610 and 612 in the hold down brackets are complementally formed to fit over the slots 606 and 608 formed in the cross bar when the brackets are moved in the direction of arrow H. Then, the hold down brackets 122 and 124 are riveted or welded to the walls of the frame. The damper is now ready to accept springs, triggering devices such as smoke or fire detectors, volume control damper operators linkages or whatever peripheral equipment may be desired to operate the damper.

FIG. 4 shows in detail the positioning of the hold down bracket 122 in the frame 102. The bracket has an inwardly depending portion 400 which is substantially perpendicular to the wall 104. This portion has a width just less than the separation between the blade edges in the closed position. Perpendicular to portion 400 is straight mounting portion 402 which, in FIG. 4, is shown welded to wall 104 at welds 401, 403, and 405. Joined to portion 402 is the transition portion 404 which leads slightly away from the wall 104 so that the slotted terminal portion 406 with slot 612 aligns with slot 608 in the end of the cross bar.

An alternate embodiment of the butterfly damper is the single blade damper of FIG. 7. A hinge element 700 comprising a single hook-shaped portion 701 and a straight portion 703 is attached by rivets 702 to the wall 704 of the duct. A complementally formed hinge shaped portion 706 of the blade 708 similar to that disclosed with the butterfly damper is employed. If desired, insulation material 312 can be attached to the blade 708 thereby insulating one side of the duct from high temperatures present on the other side. In order to lock the blade in the open position with the blade parallel to the wall of the duct and to the flow of the air through the duct, a pawl member 712 similar to that shown for the butterfly damper is attached to the wall of the duct. The pawl member passes through an opening 714 in the blade and insulation material to engage the mounting member designated generally 716 mounted on the blade surface. In the preferred embodiment, a spring clip 718 and bracket 720 are mounted opposite from the hinge element on the opposite wall 722 of the duct to lock the blade in the closed position should the link pawl be released due to high temperature. The bracket 720 acts as an automatic stop means to prevent the blade from moving beyond the full closed position, but any suitable projection into the duct such as a crimp formed in the duct wall will serve this purpose.

FIG. 8 shows an alternate way of providing heat insulation capability on the butterfly damper. In the preferred embodiment, the planar sections 800 and 802 of the blades 804 and 806 are shown each with at least two dimple portions 808, 810, 812 and 814 which form generally circular raised portions or projections which extend out from the remaining portion of the blade. The insulation material 816 is laid on these projections parallel to the planar portion 800 and 802 of the blades. In this way, an air space 818 is provided between the insulation material and the planar portion of the blade adding insulation characteristics.

A recently conducted Underwriters Laboratories test on the heat insulation characteristics of fire dampers, shows the effectiveness of applicant's air gap design. After one hour in a high temperature environment the average temperature of the atmosphere on the protected side of the standard damper was 738° F.; after two hours, 932° F.; and after three hours, 1070° F. Applicant's damper with one-half inch wall board insulation (gypsum sheetrock) on both sides of the damper blades with no air space resulting in a temperature of 765° F. after one hour; 957° F. after two hours; and 1128° F. after three hours. However, with one-half inch wall board on only one side of the damper blades and with one-eighth of an inch air space between the wall board and the damper blades, the fire damper provided the following temperatures: 740° after one hour; 927° after two hours; and 1067° after three hours. It will be noted, that these temperatures compare very favorably with the average temperature of the standard damper design used by the Underwriters Laboratories, Inc. When the air space between the wall board and the blade was maximized to one-fifth of an inch, the temperatures that resulted were below the average temperature of the standard design, those temperatures being 719° after one hour; 886° after two hours; and 1019° after three hours.

The material 816 can be attached to the blades in any suitable fashion such as a screw 820 with nut 822, a rivet 824 or with a stamped out tab 826 formed from the blade itself which passes through the insulation material and is bent over to hold the insulation material to the blade.

Insulation material may be applied to both sides of the blades. In FIG. 8, with the blades in the closed position, the insulation material 828 is shown overlapping the straight connecting portion 316 of the cross bar 120 to give maximum insulation capability of the blades when they are in the closed position.

An alternate approach in providing the air gap over that of the dimple portions of the blades is to provide minimal conduction washers 900 shown in FIG. 9. Each washer comprises a flat planar portion 902 with a plurality of projections 904 and 906 extending therefrom. As the tab, screw or rivet 908 is placed through the insulation material, the washer, and the blade to fasten the material thereto, the minimal conduction washer is placed intermediate the insulation material and the blade with the projection providing an air space or separation between the insulation material and blade as similarly described for the dimple configuration.

Referring to FIG. 8, heat propagating along the duct encounters several barriers when the blades are in the closed position. First of all it encounters the insulation material 828 which reflects the heat back into the fire or direction from which it came. The insulation material 828, such as fire resistant gypsum sheetrock, is white and this aids in reflecting the heat. Only a diminished amount of the heat which passes through the material 828 to heat the blades 800 and 802 is in direct contact with the second layer of insulation material 816, the direct contact being limited to the dimple portions 808, 810, 812 and 814 or alternatively, the washers 900 in FIG. 9. Heat which radiates from the planar portions 804 and 806 is further attenuated by the air gap or space 818 before encountering the second white layer of insulation material 816. Again the heat is reflect back away fom the interior of the duct.

It will be understood that various changes in the details, materials and arrangement of parts which have bee herein described and illustrated in order to explain the nature of this invention, may be made by those skilled in the art within the principle and scope of the invention as expressed in the following claims.

It will be further understood that the "Abstract of the Disclosure" set forth above is intended to provide a non-legal technical statement of the contents of the disclosure in compliance with the rules of practice of the United States Patent and Trademark Office, and is not intended to limit the scope of the invention described and claimed herein.

What is claimed is:

1. A fire control damper for use in a duct, said damper comprising:
   (a) a cross bar which extends across the opening of the duct;
   (b) a plurality of substantially planar blades which engage said cross bar for pivotal displacement about said cross bar between open and closed positions; and
   (c) linkage means for restraining the blades in the open position and for releasing the blades when the temperature of the atmosphere in said duct reaches a preselected temperature, said linkage means comprising:
      (i) a mounting member attached on one side of a first one of said blades, said first blade having an opening;
      (ii) a pawl attached to a second one of said blades and extending therefrom to pass through said opening in said first blade to engage said mounting member and being restrained thereby when said blades are in the open position; and
      (iii) a heat responsive means attached to said mounting member for releasing said pawl from said mounting member when the ambient temperature exceeds said preselected temperature.

2. The invention of claim 1 wherein said blades are substantially parallel and spaced apart when in said open position, the substantially parallel surfaces of said blades which face each other when said blades are in the open position defining interior surfaces with the remaining surfaces of said blades defining outer surfaces, said link assembly attached to said outer surface of said first blade, said pawl attached to said interior surface of said second blade.

3. The invention of claim 1 wherein said heat responsive means is a bimetallic link attached to said mounting member.

4. A fire control damper for use in a duct, said damper comprising a cross bar which extends across the opening of the duct, said cross bar comprising a plurality of integrally formed hook-shaped hinge elements; and a plurality of blades, each of said blades having a substantially planar portion and a hook-shaped longitudinal edge portion complementally engaging said hook-shaped hinge elements of said cross bar for pivotal displacement about said cross bar between open and closed positions, said damper further comprising a frame having an inwardly-depending flange, said cross bar extending between opposing walls of said frame and being attached at opposite sides of said flange, portions of said frame being configured to limit longitudinal movement of said blades with respect to said cross bar.

5. The invention of claim 4 wherein said damper further comprises closure means for maintaining a force on said blades to move said blades towards said closed position, said closure means comprising a spring attached to a first surface of each of said blades and arching around said cross bar, said spring exerting a force to move said blades away from one another and towards said closed position when said blades are in the open position.

6. The invention of claim 4 wherein said damper further comprises a plurality of releasable locking spring clips attached to said duct, said releasable locking spring clips engaging said blades when said blades are in the closed position to hold said blades in the closed position, each of each clips comprising means for facilitating the manual release of its associated blade from either side of said blade.

7. The invention of claim 4 wherein the shape of said frame is rectangular.

8. The invention of claim 4 wherein the shape of said frame is circular.

9. The invention of claim 4 wherein said damper further comprises heat insulation material attached to first and second sides of said planar portion of said blades.

10. The invention of claim 9 wherein said cross bar further comprises a substantially longitudinal flat connecting portion joining said hook-shaped hinge elements and said insulation material attached to said second sides of said blades overlaps a portion of said connecting portion of said hinge element.

11. The invention of claim 10 wherein a portion of said insulation material attached to said second sides of said blades overlaps substantially all of said connecting portion of said hinge element.

12. A fire damper for use in a duct, said damper comprising: at least one blade; pivoting means for pivotal displacement of said blade between open and closed positions with respect to said duct; and heat insulation means to insulate the atmosphere of one side of said damper from the atmosphere of the remaining side of said damper when said blade is in the closed position, said insulation means comprising: heat insulation material; and spacing means for supporting said material substantially parallel to and spaced apart from at least a portion of one side of said blade.

13. The invention of claim 12 wherein said spacing means comprises at least two dimple portions in said blade for projecting a portion of said blade away from the remaining portion of said blade.

14. The invention of claim 12 wherein said spacing means comprises a minimal conduction washer, said washer having a substantially planar portion and a plurality of projections extending therefrom, said washer position intermediate said insulation material and said blade.

15. The invention of claim 12 wherein said damper further comprises insulation attachment means for attaching said insulation material to said blade, said insulation attachment means comprising a fastening tab formed from said blade, said tab passing through said insulation material and bent over a portion of said material.

16. A fire damper for use in a duct, said damper comprising: at least one blade having an opening; pivoting means for pivotal displacement of said blade between open and closed positions with respect to said duct; and linkage means for holding said blade in the open position, said linkage means further comprising: a mounting member attached on one side of said blade; a pawl attached to said duct and extending away therefrom to pass through said opening in said blade to engage said mounting member when said blade is in the open position; and a heat responsive means for releasing said link pawl from said mounting member when the ambient temperature exceeds a preselected temperature whereby said blade is free to move towards said closed position, and wherein said blade further comprises a hook-shaped edge portion and wherein said pivotal means comprises a hook-shaped hinge element for complementally engaging said hook-shaped edge portion, said hinge element being attached to a wall of said duct.

17. A method of fabricating a fire damper for use in a duct comprising the steps of:
 (a) providing a frame having the configuration of said duct, said frame having an inwardly-depending flange;
 (b) providing a cross bar having two integral hook-shaped hinge elements;
 (c) providing two blades having hook-shaped longitudinal edge portions;
 (d) inserting said hook-shaped longitudinal edge portions of said blades into said hook-shaped hinge element on said cross bar to form a blade and hinge portion;
 (e) placing said blade and hinge portion within said frame with the ends of said cross bar resting upon two points of said flange;
 (f) positioning hold-down brackets over the ends of said cross bar to hold said cross bar against said flange; and
 (g) attaching said hold-down brackets to said frame.

18. The invention of claim 17 wherein the steps of providing a frame further comprises bending a single piece of material to form said frame in the configuration of said duct and fastening said material at a single place.

19. The invention of claim 17 wherein said method of fabricating a fire damper further comprises providing a cross bar having at least one slot on each end and positioning complementally slotted hold-down brackets over said slotted cross bar to accurately align said cross bar with said hold-down brackets.

* * * * *